M. J. LAWLESS.
COVER FASTENING DEVICE FOR RECEPTACLES.
APPLICATION FILED AUG. 8, 1912.

1,108,765.

Patented Aug. 25, 1914.

2 SHEETS—SHEET 1.

Witnesses
P. M. Fowler Jr
B. A. Hanway

Inventor
Michael J. Lawless
By Mason Fenwick & Lawrence
Attorneys

THE NORRIS PETERS CO., PHOTO-LITHO., WASHINGTON, D. C.

M. J. LAWLESS.
COVER FASTENING DEVICE FOR RECEPTACLES.
APPLICATION FILED AUG. 8, 1912.
1,108,765.
Patented Aug. 25, 1914.
2 SHEETS—SHEET 2.
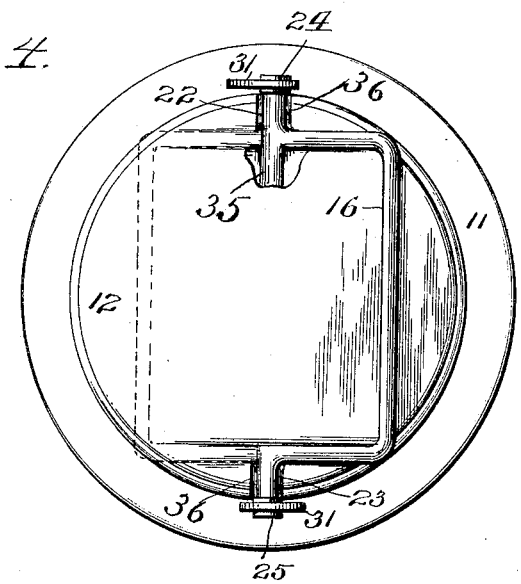
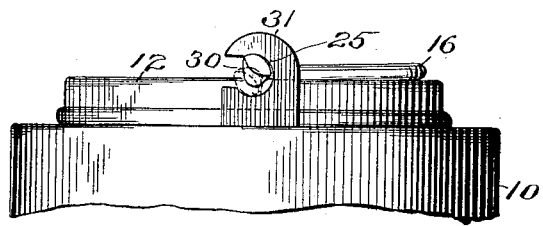
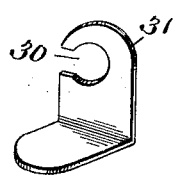 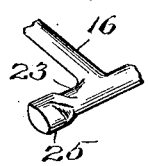 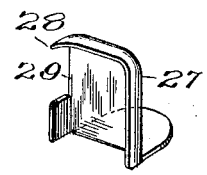
Witnesses
J. M. Fowler Jr
B. A. Hanway
Inventor
Michael J. Lawless
By Mason Fenwick & Lawrence
Attorneys

UNITED STATES PATENT OFFICE.

MICHAEL J. LAWLESS, OF OMAHA, NEBRASKA.

COVER-FASTENING DEVICE FOR RECEPTACLES.

1,108,765.   Specification of Letters Patent.   Patented Aug. 25, 1914.

Application filed August 8, 1912.   Serial No. 714,088.

*To all whom it may concern:*

Be it known that I, MICHAEL J. LAWLESS, citizen of the United States, residing at Omaha, in the county of Douglas and State of Nebraska, have invented certain new and useful Improvements in Cover-Fastening Devices for Receptacles; and I do hereby declare the following to be a full, clear, and exact description of the invention, such as will enable others skilled in the art to which it appertains to make and use the same.

This invention relates to cover fastening devices for receptacles and especially for vacuum freezers.

The object is to provide an improved clamping and fastening device which shall also include a handle for the receptacle and a fastening device which is automatically secured when the handle is brought into position for lifting the aforesaid receptacle, and is then further clamped.

With these objects in view, the invention consists in part in providing a handle with lugs or cam members on the ends thereof, the handle being pivoted to the cover, and the lugs being arranged to engage ears projecting upwardly from the top, adjacent to the cover proper.

Other novel features of construction will be described below.

Figure 1:
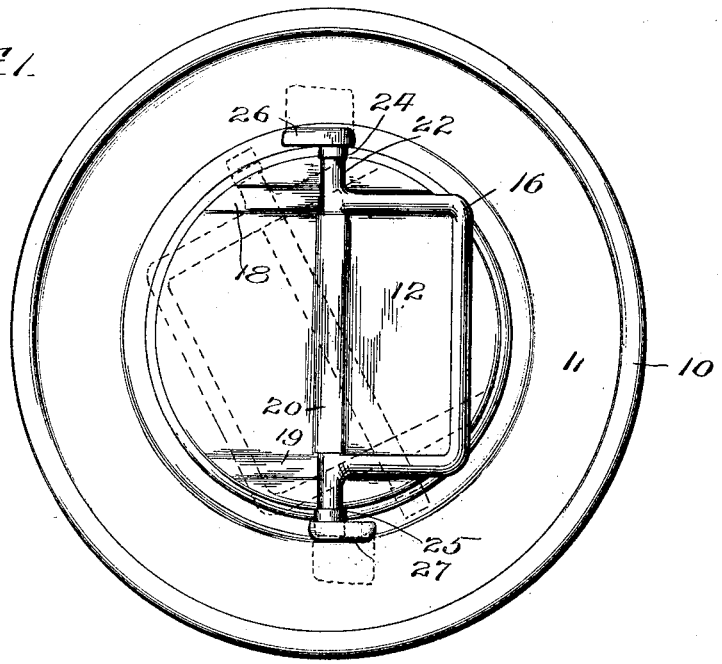
Figure 2:
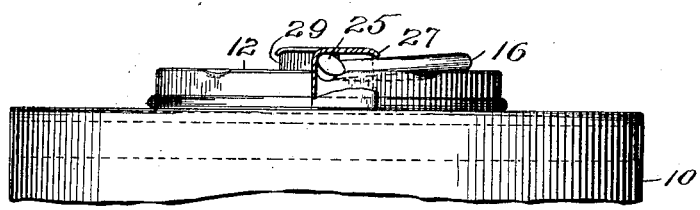
Figure 3:
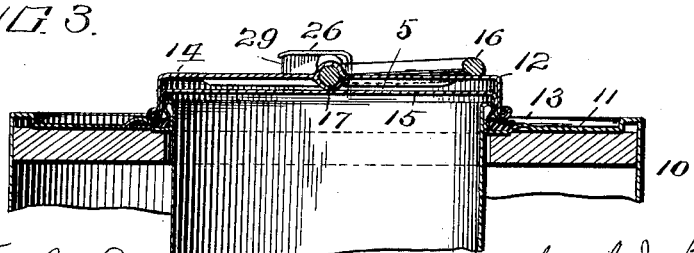

In the accompanying drawings forming part of this application, Figure 1 is a top plan view of the device. Fig. 2 is a view chiefly in elevation. Fig. 3 is a view in vertical section. Fig. 4 is a top plan view of a slightly modified form. Fig. 5 is an elevation thereof. Figs. 6, 7 and 8 are detail views, in perspective.

The receptacle 10 is shown as being provided with a permanent top portion 11 having a central opening for an inner receptacle 5 which is closed by the cover herein described.

The cover is indicated by 12 and the flange thereof bears upon a gasket 13. The cover is formed of an upper member 14 and a lower member 15, the upper member being grooved by stamping or otherwise, for the accommodation of the handle 16. One of the grooves 17 extends across the middle portion of the cover and parallel grooves 18 and 19 intersect groove 17 at right angles and are located near the edges of the cover. A semi-cylindrical portion 20 is secured over groove 17 and forms therewith a tubular portion for the pivotal portion of the handle 16. The handle has laterally extending members 22 and 23, terminating in cam-shaped lugs 24 and 25, which form an important feature of the invention. As shown in Fig. 2 and more clearly in Fig. 5, these cam members are eccentrically mounted with reference to the lower pivotal bar of the handle. They are adapted to engage ears of the form shown in Fig. 8, and are designated respectively 26 and 27 in Fig. 1. The ears are flanged at 28, the flange being cut away at 29 for admitting the cam members, the openings 29 being oppositely located in ears 26 and 27.

The dotted line position of the handle in Fig. 1 shows the cover when first applied to the can, after which it is partly rotated to bring it into the full line position. Before rotation, the handle would be turned toward the left (Figs. 1 and 2), and is then thrown over for the purpose of causing the cam members to engage the flanges of the ears, which they do with a clamping effect on the cover because of their shape and the eccentric mounting before referred to. The clamping movement is begun as the handle assumes an upright position, and is continued as the handle is brought over to the extreme right, in Fig. 2. When in a flat position the side portions of the handle rest in portions of grooves 18 and 19.

In the modified form shown in Fig. 5 the ears have no upper and side flanges but are provided with openings 30 for the cam members, the ears proper being designated 31. It will thus be observed that the cover is clamped in the act of bringing the handle into operative position, avoiding all danger of leaving the receptacle unsealed.

Fig. 4 shows the portion 35 of the handle as extending below the top of the cover, the end portions 22 and 23 being disposed in recesses 36 at the edge of the cover.

What I claim is:

The combination with a receptacle, of a cover provided with a flange engaging the sides of the receptacle permitting rotary movement but not lateral movement of the cover, ears formed upon the receptacle positioned adjacent the periphery of the cover and open in opposite directions and an eccentric rock shaft carried by the cover having its ends extending beyond the periphery of the cover and in position to engage under the ears, such eccentricity serving to clamp the cover when the rock shaft is rotated.

In testimony whereof I affix my signature in presence of two witnesses.

MICHAEL J. LAWLESS.

Witnesses:
J. A. C. KENNEDY,
GUY V. FURAY.

Copies of this patent may be obtained for five cents each, by addressing the "Commissioner of Patents, Washington, D. C."